(12) United States Patent
Wang

(10) Patent No.: US 8,473,936 B2
(45) Date of Patent: Jun. 25, 2013

(54) SYSTEM AND METHOD FOR RUNTIME CLASS EXTRACTING

(75) Inventor: Qiang Wang, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 450 days.

(21) Appl. No.: 12/752,412

(22) Filed: Apr. 1, 2010

(65) Prior Publication Data

US 2011/0197183 A1 Aug. 11, 2011

(30) Foreign Application Priority Data

Feb. 10, 2010 (CN) .......................... 2010 1 0110578

(51) Int. Cl.
*G06F 9/45* (2006.01)
(52) U.S. Cl.
USPC .......................................... 717/166; 717/162
(58) Field of Classification Search
USPC ....................................................... 717/166
See application file for complete search history.

(56) References Cited

U.S. PATENT DOCUMENTS

| | | | | |
|---|---|---|---|---|
| 6,072,953 A * | 6/2000 | Cohen et al. | .................. | 717/166 |
| 6,429,860 B1 * | 8/2002 | Hughes | .......................... | 345/418 |
| 7,039,738 B2 * | 5/2006 | Plummer et al. | .............. | 710/260 |
| 7,039,923 B2 * | 5/2006 | Kumar et al. | ................. | 719/331 |
| 7,058,929 B2 * | 6/2006 | Charnell et al. | ............. | 717/135 |
| 7,069,550 B2 * | 6/2006 | Fraenkel et al. | ............. | 717/166 |
| 7,337,434 B2 * | 2/2008 | Nichols et al. | ................ | 717/132 |
| 7,516,166 B2 * | 4/2009 | Normington | ......................... | 1/1 |
| 7,647,336 B2 * | 1/2010 | Branda et al. | .......... | 707/999.102 |
| 7,665,080 B2 * | 2/2010 | Spotwood | ...................... | 717/166 |
| 7,685,589 B2 * | 3/2010 | Trowbridge | .................. | 717/166 |
| 7,721,277 B1 * | 5/2010 | Thyagarajan et al. | ........ | 717/166 |
| 7,784,043 B2 * | 8/2010 | Atsatt | ........................... | 717/166 |
| 7,814,472 B2 * | 10/2010 | Atsatt | ........................... | 717/166 |
| 7,941,402 B2 * | 5/2011 | Smits | ............................ | 707/638 |
| 7,954,096 B2 * | 5/2011 | Atsatt | ........................... | 717/166 |
| 8,196,129 B2 * | 6/2012 | Martin et al. | ................. | 717/166 |
| 8,250,559 B2 * | 8/2012 | Daynes et al. | ................ | 717/166 |
| 2002/0108107 A1 * | 8/2002 | Darnell et al. | ................ | 717/153 |
| 2002/0112227 A1 * | 8/2002 | Kramskoy et al. | ............ | 717/148 |
| 2003/0009743 A1 * | 1/2003 | Fresko et al. | ................. | 717/117 |
| 2004/0015936 A1 * | 1/2004 | Susarla et al. | ................ | 717/166 |
| 2004/0221268 A1 * | 11/2004 | Nichols et al. | ................ | 717/124 |
| 2005/0060698 A1 * | 3/2005 | Boykin et al. | ................ | 717/166 |

(Continued)

OTHER PUBLICATIONS

Hovemeyer, David, and William Pugh. "More efficient network class loading through bundling." Proceedings of the USENIX JVM 1 (2001).*
Rayside, Derek, and Kostas Kontogiannis. "Extracting Java library subsets for deployment on embedded systems." Software Maintenance and Reengineering, 1999. Proceedings of the Third European Conference on. IEEE, 1999.*

*Primary Examiner* — Wei Zhen
*Assistant Examiner* — Matthew Brophy
(74) *Attorney, Agent, or Firm* — Fliesler Meyer LLP

(57) ABSTRACT

An application running on a virtual machine includes a plurality of runtime classes. A class loader can load one or more runtime classes of the plurality of runtime classes into the virtual machine to support an operation on the application. In addition, the class loader can record a context information for each runtime class of the one or more runtime classes. Based on the recorded context information of each runtime class, the one or more runtime classes can be extracted.

15 Claims, 3 Drawing Sheets

U.S. PATENT DOCUMENTS

| | | | |
|---|---|---|---|
| 2007/0061795 A1* | 3/2007 | Atsatt | 717/166 |
| 2007/0106716 A1* | 5/2007 | Corrie | 707/206 |
| 2007/0198974 A1* | 8/2007 | Branda et al. | 717/166 |
| 2007/0276901 A1* | 11/2007 | Glinsky et al. | 709/203 |
| 2008/0222624 A1* | 9/2008 | Mausolf et al. | 717/166 |
| 2009/0276767 A1* | 11/2009 | Brannen et al. | 717/166 |

\* cited by examiner

# SYSTEM AND METHOD FOR RUNTIME CLASS EXTRACTING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF FOREIGN PRIORITY

This application claims priority to Chinese Patent Application No. 201010110578.4, filed Feb. 10, 2010, entitled "SYSTEM AND METHOD FOR RUNTIME CLASS EXTRACTING", which is incorporated herein by reference.

FIELD OF INVENTION

The present invention generally relates to Java runtime environments, and particularly to a means of extracting runtime class for various applications.

BACKGROUND

A software library is a collection of related object code, such as the use of Java classes in the Java language. Software libraries are typically packaged in modules, such as Java archive (Jar) files. In a Java environment, at runtime a class loader is responsible for locating libraries, reading their contents, and loading the classes contained within the libraries into the Java Virtual Machine (JVM). Usually classes are loaded on demand, at the time when each of those classes are actually used by the program. Class loaders shield the runtime system from needing to understand the exact structure of the underlying file system and files therein.

An enterprise-level software application, such as an application server, can include many modules or Jars. Each of the separate modules or Jars contains only a subset of functionalities out of the larger application. A class loader can load different modules or Jars of the enterprise-level software application into the virtual machine to provide certain functionalities. In some instance, not every module or Jar is loaded into the virtual machine, since only a subset of the functionalities of the enterprise-level software application is used. This is the general area the embodiments of the invention are intended to be used.

SUMMARY

In accordance with an embodiment, an application running on a virtual machine includes a plurality of runtime classes. A class loader can load one or more runtime classes of the plurality of runtime classes into the virtual machine to support an operation on the application. In addition, the class loader can record a context information for each runtime class of the one or more runtime classes. Based on the recorded context information of each runtime class, the one or more runtime classes can be extracted.

DETAILED DESCRIPTION

The present invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the embodiments of the invention as following uses WebLogic® application server functions or libraries as an example for application server functions or libraries. It will be apparent to those skilled in the art that other types of application server functions or libraries can be used without limitation.

In accordance with an embodiment, an enterprise-level application server can include many modules or Jars. Separate modules or Jars can be created to contain a specific subset of functionalities out of a large application. An advantage of creating separate modules or Jars to contain only a specific subset of functionalities is that it reduces the overall footprint of the systems and/or applications, by not including classes and resources files of unnecessary functionalities, when only a subset of functionalities are needed.

For example, a web services client Jar can be provided in a standalone environment at the web services client side, without an application server installation. A minimal set of classes can be selected to satisfy the need of all client features at runtime, and still keep the footprint as small as possible.

In accordance with an embodiment, one approach to select the minimal set of classes is to analyze the source code that implements the enterprise-level application server and select related classes and files that are required by the client applications at runtime. However, it usually takes a considerable amount of time to analyze the source code, class by class, including taking into account dependency relationships for each class.

In accordance with an embodiment, an alternative approach to select the minimal set of classes is to use a runtime class extractor, which can record all loaded runtime classes when one or more specific functions are performed on the application.

Figure 1:
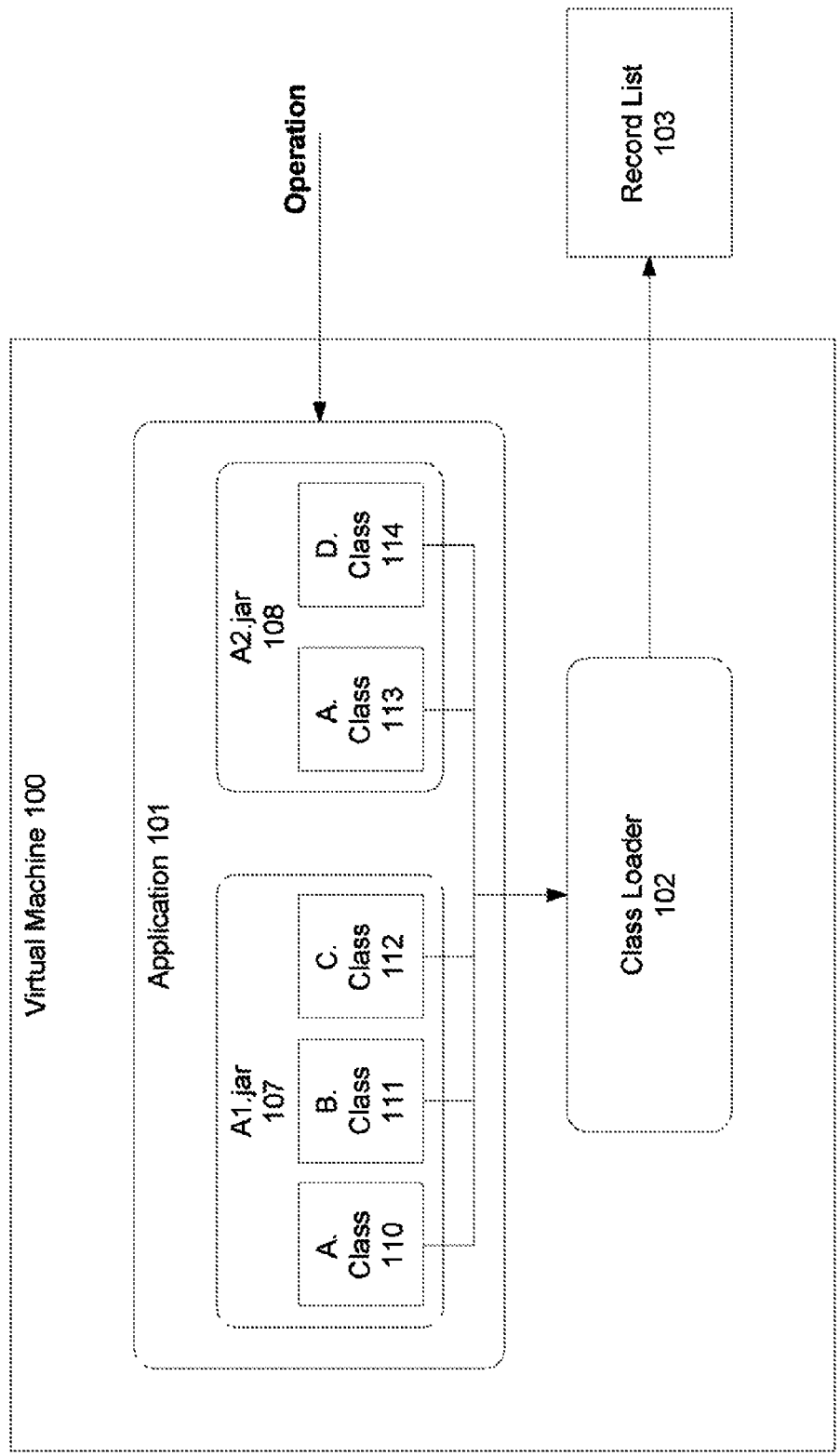
FIG. 1 is an illustration that shows an example of a runtime class extractor in a virtual machine, in accordance with an embodiment.

FIG. 1 is an illustration that shows an example of a runtime class extractor in a virtual machine, in accordance with an embodiment. As shown in FIG. 1, an application 101 runs on a virtual machine 100 that includes a plurality of runtime classes 110, 111, 112, 113, and 114. The runtime classes can be contained in several different modules or Jars 107 and 108. In accordance with an embodiment, the same runtime class A. Class 110 and 113 can be contained in different Jars 107 and 108. In addition, the virtual machine 100 is associated with a class loader 102, which can load each of the runtime classes 110, 111, 112, 113, or 114 into the virtual machine 100.

The application 101 provides one or more operations that can be performed by a user. Each of the operations is performed based on one or more runtime classes 110, 111, 112, 113, or 114 that were loaded in by the class loader 102. In accordance with an embodiment, the class loader 102 is modified to record the one or more runtime classes that are used when the one or more operations are performed.

In accordance with an embodiment, the virtual machine, such as the Java Virtual Machine (JVM) uses a dynamic class loading means to load required classes into the JVM from a class path definition at runtime. The runtime class extractor uses a record class loader that is responsible for loading classes and recording the selected runtime classes into a file. The system class loader is configured to ensure that all required classes are loaded by this record class loader.

Figure 2:
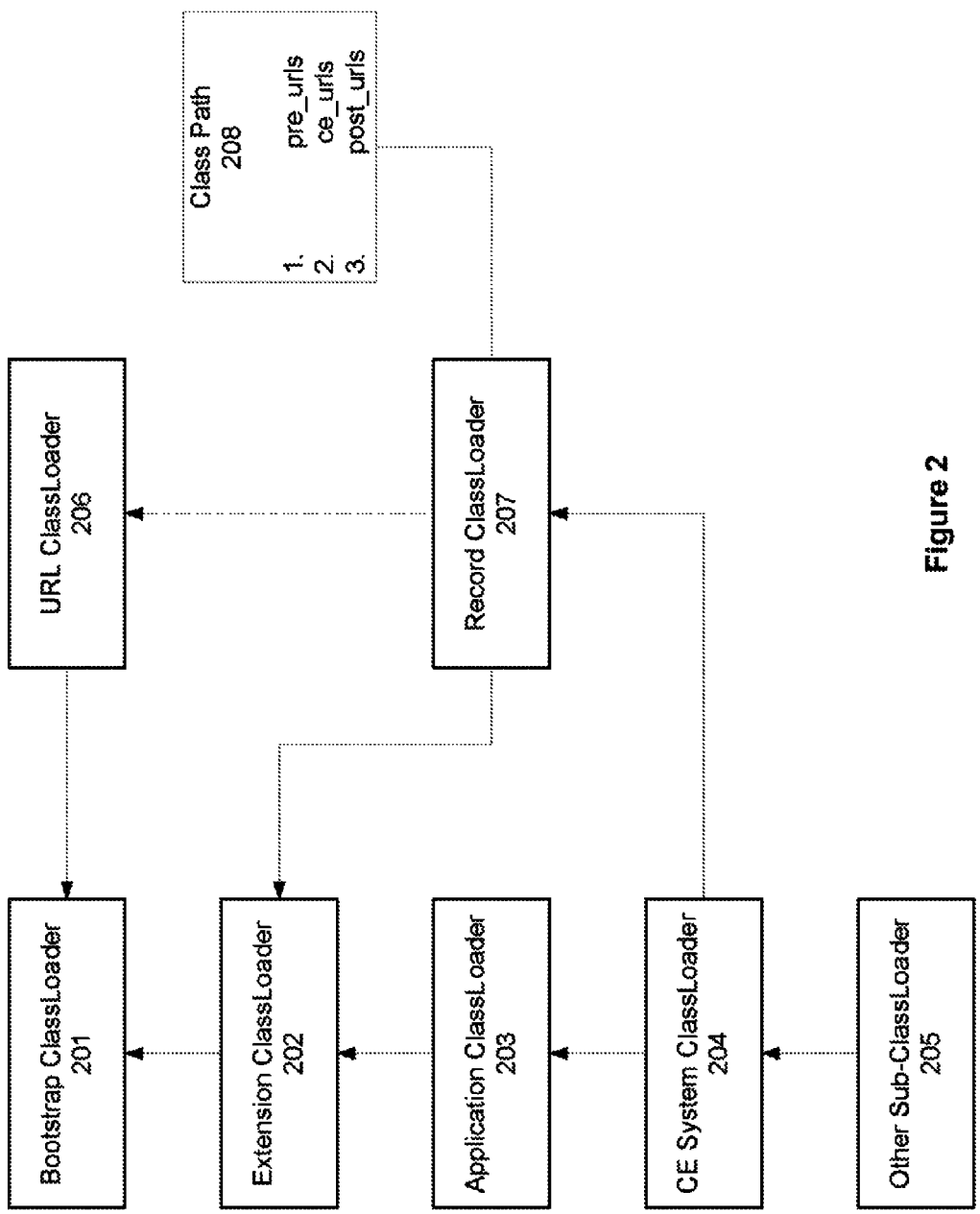
FIG. 2 is an illustration that shows an example of a runtime class extractor in a JVM class loader hierarchy and delegation model, in accordance with an embodiment.

FIG. 2 is an illustration that shows an example of a runtime class extractor in a JVM class loader hierarchy and delegation model, in accordance with an embodiment. As shown in FIG. 2, all Java runtime class loaders delegate, directly or indirectly, to a bootstrap class loader 201, often referred to as the base class loader. During normal execution of an application, an application class loader 203 is used to load various runtime classes into the virtual machine, through an extension class loader 202.

A system class loader 204 can be used for extracting runtime classes. The system class loader 204 is a self-defined class loader that can be set to use other sublevel class loaders 205, and can be initiated in the virtual machine by defining the class name for the class loader and the path that the system loader can be located by the virtual machine.

By way of example, a Java class loader can be specified within the JVM using the options: Djava.system.class.loader and Xbootclasspath. The Djava.system.class.loader option defines the class name for class loader; and the Xbootclasspath option defines the path where the system loader is located.

In accordance with an embodiment, the system class loader 204 can delegate its function to another class loader 207 internally to receive class path URL definitions. The delegated class loader 207 can be a record class loader that extends from a URL class loader 206. The delegated class loader or record class loader 207, can operate, as delegated by the system class loader, to load in runtime classes instead of the application class loader 203.

In accordance with an embodiment, the record class loader 207 can locate classes based on a predefined target class path 208. For example, an actual CLASSPATH definition, that is used by the class loaders for locating runtime classes or Jars, can be in the form of "pre_URLs;ce_URLs;post_URLs."

In accordance with an embodiment, a target class path can be defined in a plurality of sections, such as pre_classpath, ce_classpath, and post_classpath. The ce_classpath section of the target class path defines the modules or Jars that need to be recorded if one or more classes within a specific module or jar are loaded in runtime. The pre_classpath section defines the modules or Jars that include API Jars, or libraries such as the JDK library (tools.jar) in the Java platform. In accordance with an embodiment, there is no need to record these Jars, or the classes from these Jars in runtime. There is similarly no need to record classes in modules or Jars from the post_classpath section of the target class path. A module or Jar defined in post_classpath section includes one or more classes that are also defined in another jar which is defined in ce_classpath section of the target class path.

For example, A1.jar includes A.class, B.class, and C.class; A2.jar includes A.class and D.class; and A1.jar is defined in ce_classpath and all the classes in A1.jar need to be recorded. Hence, A2.jar needs to be defined in post_classpath, since A2.jar includes A.class, which is part of the A1 jar that is defined in the ce_classpath, and D.class which does not to be recorded.

In accordance with an embodiment, the context information of a runtime class can be recorded into a record file. Such context information includes a full-qualified name and an actual location of the class. In addition, the record file can use the format as shown in Table 1.

TABLE 1 a sample format for a record file.

class-full-name@location-of-the-class
e.g.
sample.package.HelloWorld@d:/sample_dir/lib/sample.jar In accordance with an embodiment, after classes are recorded, one or more modules or Jars can be generated to contain the select classes and associated resources. All of the generated modules or Jars can be defined in a new class path, such as a regenerated_jars class path. The target class path can also be updated to contain pre_classpath, regenerated_jars, and post_classpath in a user environment. The recorded runtime classes can be loaded into the virtual machine, based on the updated target class path, using the original application class loader 203 that is associated with the application. There is no need to modify the original application class loader 203.

In accordance with an embodiment, the record class loader 207 can use a loadClass( ) method. This method is responsible for loading classes from the above three class path definitions, and recording every class once if the class is within a module or jar that is defined in the ce_classpath section of the target class path.

In accordance with an embodiment, the actual location of a Java class can be determined from a code source in the protection domain of the class. The code source is an encapsulation of the location from which the Java class can be obtained, while the protection domain is an encapsulation of a particular code source and the permissions granted to that code source. If the protection domain is not found, or the actual location of the Java class is not found in the protection domain, the location of the Java class can be determined from the class loader for the Java class or from a system class loader if the class loader for the Java class is not available.

Figure 3:
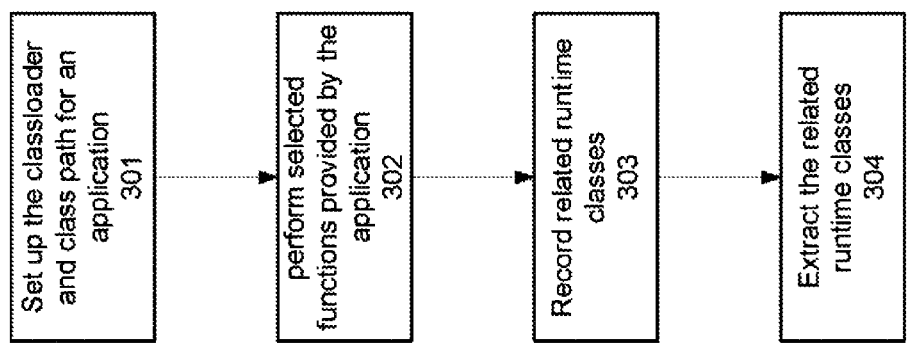
FIG. 3 is a flowchart of a method for extracting runtime class in a virtual machine, in accordance with an embodiment.

FIG. 3 is a flowchart of a method for extracting runtime class in a virtual machine, in accordance with an embodiment. As shown in FIG. 3, an application is provided in a virtual machine that is associated with a class loader, at step 301. The application includes a plurality of runtime classes, and each of the plurality of runtime classes can be loaded into the virtual machine by the class loader. Then, one or more operations provided by the application can be performed, at step 302. The one or more operations are associated with one or more runtime classes, and the class loader can load the one or more runtime classes into the virtual machine. In order to extract the related runtime classes, the class loader, at step 303, can record the name and location of the one or more runtime classes. Finally, at step 304, the one or more runtime classes can be extracted, either by creating a new copy for each recorded runtime classes and repackaging into a separate module or jar, or by removing all the runtime classes that are not recorded.

In accordance with an embodiment, a runtime class extractor can be set up in a Java Virtual Machine (JVM). Table 2 is an example of java-options to enable the extractor in java command:

TABLE 2 a sample java-options for enabling the extractor in java command.

export JAVA_OPTS="
    -Djava.system.class.loader=myce.CESystemCL \
    -Xbootclasspath=myce.jar \

TABLE 2-continued a sample java-options for enabling the extractor in java command.

```
-Dce.pre.class.path='some pre jars...' \
-Dce.class.path='some product jars...' \
-Dce.post.class.path='some post jars...' "
```

In accordance with an embodiment, a system class loader can delegate the class loading and recording functionalities to a record class loader. Table 3 shows a pseudo code excerpt for a system class loader.

TABLE 3 a pseudo code excerpt for a system class loader.

```
public class CESystemCL extends ClassLoader {
    private RecordCL rloader = null;
    public CESystemCL(ClassLoader parent) {
        super(parent);
        // make extClassLoader as parent
        while (parent.getParent( ) != null)
            parent = parent.getParent( );
        //get ce.pre.class.path, ce.class.path, ce.post.class.path from system
        //properties with sun.misc.URLClassPath.pathToURLs( )
        ...
        //construct all jars from above 3 urls
        ...
        allJars = ...
        rloader = new RecordCL(allJars, parent);
    }
    @Override
    protected synchronized Class<?> loadClass(String name, boolean resolve) throws ClassNotFoundException {
        //delegate to RecordCL
        return rloader.loadClass(name, resolve);
    }
    @Override
    public URL getResource(String name) {
        return rloader.getResource(name);
    }
    @Override
    public Enumeration<URL> getResources(String name)
        throws IOException
    {
        return rloader.getResources(name);
    }
}
```

In accordance with an embodiment, the record class loader can locate runtime classes based on the pre-defined class path information, and load the runtime classes into the virtual machine. Table 4 shows a pseudo code excerpt for a record class loader.

TABLE 4 a pseudo code excerpt for a RecordCL classloader.

```
public class RecordCL extends URLClassLoader{
    public RecordCL(URL[ ] alljars, ClassLoader parent) {
        super(alljars, parent);
        this.parent = parent;
    }
    public Class<?> loadClass(String name, boolean resolve)
        throws ClassNotFoundException {
        //load class and get the location of the class
        ......
        //if the location is in ce.classpath, record it
        ......
    }
    public URL findResource(final String name) {
        URL ret = super.findResource(name);
        //record it if the url is not null and required
        return ret;
    }
```

TABLE 4-continued a pseudo code excerpt for a RecordCL classloader.

```
    public Enumeration<URL> findResources(final String name)
        throws IOException{
            Enumeration<URL> ret = super.findResources(name);
            //record it if required.
            return ret;
    }
}
```

In accordance with an embodiment, the runtime class extractor focuses on the implementation of the record class loader, and avoids modifying the implementation of different application class loaders. The runtime class extractor can, conveniently, find out classes that are necessary at runtime to support a specific set of functionalities of a large application. There is also no need to modify the code of the application in a significant way.

In accordance with an embodiment, some class dependencies may need to be determine if full code coverage at runtime cannot be achieved, and, accordingly, those classes may not be recorded and extracted.

The present invention may be conveniently implemented using a conventional general purpose or a specialized digital computer or microprocessor programmed according to the teachings of the present disclosure. Appropriate software coding can readily be prepared by skilled programmers. based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The code examples given are presented for purposes of illustration. It will be evident that the techniques described herein may be applied using other code languages, and with different code. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method, comprising:
   setting up a system class loader in a virtual machine operating on one or more microprocessor, wherein an application that is associated with a plurality of runtime classes and runs on the virtual machine;
   supporting an operation to be performed on the application by identifying a subset of the plurality of runtime classes, the subset including only those runtime classes used during performance of the operation on the application and including less than all of the plurality of runtime classes associated with the application;
determining class path information for each runtime class of the subset that allows the operation to be performed on the application, wherein the class path information allows the system class loader to locate each said runtime class in order to load each said runtime class in the virtual machine;
recording, via the system class loader, the class path information for each runtime class of the subset;
extracting the subset of the plurality of runtime classes based on the recorded class path information; and
providing a separate module including only each runtime class in the subset.

2. The method according to claim 1, wherein:
providing a separate module including only each runtime class in the subset comprises copying only each runtime class in the subset into a newly generated module, wherein the newly generated module allows the operation to be performed on the application separately.

3. The method according to claim 1, wherein:
providing a separate module including only each runtime class in the subset comprises copying only each runtime class in the subset into a newly generated JAR, wherein the newly generated JAR allows the operation to be performed on the application separately.

4. The method according to claim 3, further comprising:
adding the newly generated JAR into a target class path that can be used by an application class loader.

5. The method according to claim 1, further comprising:
loading the one or more runtime classes from a pre-defined target class path.

6. The method according to claim 5, further comprising:
defining the subset of runtime classes in a section of the predefined target class path.

7. The method according to claim 1, wherein providing a separate module including only each runtime class in the subset comprises:
providing a separate module duplicating all of the plurality of runtime classes associated with the application; and
deleting from the separate module each runtime class except the subset of the plurality of runtime classes.

8. The method according to claim 1, further comprising:
delegating, via the system class loader, a class loading and recording process to a delegated class loader.

9. A system, comprising:
one or more microprocessors;
a system class loader associated with a virtual machine running on the one or more microprocessors;
an application running on the virtual machine, wherein the application includes a plurality of runtime classes, wherein each of the plurality of runtime classes is adapted to be loaded into the virtual machine by the system class loader;
wherein the system class loader operates to
support an operation to be performed on the application that runs on the virtual machine, by identifying a subset of the plurality of runtime classes, the subset including only those runtime classes used during performance of the operation on the application and including less than all of the plurality of runtime classes associated with the application;
determine class path information for each runtime class of said subset that allows the operation to be performed on the application, wherein the class path information allows the system class loader to locate each runtime class of said subset in order to load each runtime class of said subset in the virtual machine;
record the class path information for each runtime class of said subset; and
an extractor which generates a newly generated module including only each runtime class in said subset based on the recorded class path information.

10. The system according to claim 9:
wherein the newly generated module allows the operation to be performed on the application separately.

11. The system according to claim 10, wherein:
the newly generated module is added into a target class path that can be used by an application class loader associated with the application.

12. The system according to claim 9, further comprising:
a target class path that defines the one or more runtime classes to be loaded in the virtual machine.

13. The system according to claim 12, wherein:
the one or more runtime classes is defined in a section of the predefined target class path.

14. The system according to claim 9, further comprising:
a delegated class loader that is delegated by the system class loader to perform a class loading process.

15. A non-transitory machine readable medium having instructions stored thereon that when executed cause a system to perform steps comprising:
set up a system class loader in a virtual machine, wherein an application that is associated with a plurality of runtime classes operates to run on the virtual machine;
support an operation to be performed on the application that runs on the virtual machine, by identifying a subset of the plurality of runtime classes, the subset including only those runtime classes used during performance of the operation on the application and including less that all of the plurality of runtime classes associated with the application; determine class path information for each runtime class of said subset that allows the operation to be performed on the application, wherein the class path information allows the system class loader to locate each runtime class of said subset in order to load each runtime class of said subset in the virtual machine;
record, via the system class loader, the class path information for each runtime class of said subset;
extract each runtime class of said subset based on the recorded class path information; and
generate a newly generated module including only each runtime class in said subset based on the recorded class path information.

* * * * *

UNITED STATES PATENT AND TRADEMARK OFFICE
CERTIFICATE OF CORRECTION

PATENT NO. : 8,473,936 B2
APPLICATION NO. : 12/752412
DATED : June 25, 2013
INVENTOR(S) : Wang It is certified that error appears in the above-identified patent and that said Letters Patent is hereby corrected as shown below:

In the Claims

In column 8, line 17, in Claim 10, delete "claim 9:" and insert -- claim 9, --, therefor.

In column 8, line 43, in Claim 15, delete "that" and insert -- than --, therefor.

Signed and Sealed this
Twenty-second Day of October, 2013

Teresa Stanek Rea
*Deputy Director of the United States Patent and Trademark Office*